(12) United States Patent
Walker et al.

(10) Patent No.: US 11,237,567 B2
(45) Date of Patent: Feb. 1, 2022

(54) METHODS AND SYSTEMS FOR DETERMINING AND CONTROLLING VEHICLE SPEED

(71) Applicant: Freeport-McMoRan Inc., Phoenix, AZ (US)

(72) Inventors: Mary Amelia Walker, Phoenix, AZ (US); Nicholas Hickson, Phoenix, AZ (US); Robert Catron, Phoenix, AZ (US); Brian Vaughan, St. Louis, MO (US); Hung Jung Lu, St. Louis, MO (US)

(73) Assignee: Freeport-McMoRan Inc., Phoenix, AZ (US)

( * ) Notice: Subject to any disclaimer, the term of this patent is extended or adjusted under 35 U.S.C. 154(b) by 0 days.

(21) Appl. No.: 17/202,667

(22) Filed: Mar. 16, 2021

(65) Prior Publication Data
US 2021/0294343 A1   Sep. 23, 2021

Related U.S. Application Data

(60) Provisional application No. 62/990,522, filed on Mar. 17, 2020.

(51) Int. Cl.
*G05D 1/02*   (2020.01)

(52) U.S. Cl.
CPC ......... *G05D 1/0223* (2013.01); *G05D 1/0219* (2013.01); *G05D 2201/021* (2013.01)

(58) Field of Classification Search
CPC ............... G05D 1/0223; G05D 1/0219; G05D 2201/021
See application file for complete search history.

(56) References Cited

U.S. PATENT DOCUMENTS

| | | | |
|---|---|---|---|
| 8,630,779 | B2* | 1/2014 | Moran ............ B60W 30/18118 701/70 |
| 2010/0049400 | A1 | 2/2010 | Duraiswamy et al. |
| 2010/0065174 | A1 | 3/2010 | Matsunaga et al. |
| 2011/0251749 | A1 | 10/2011 | Schwarz et al. |

(Continued)

OTHER PUBLICATIONS

International Search Report and Written Opinion, dated Jun. 22, 2021, for International Application No. PCT/US2021/022499, International Filing Date Mar. 16, 2021, 8 pages.

(Continued)

*Primary Examiner* — Nicholas Kiswanto
(74) *Attorney, Agent, or Firm* — Fennemore Craig, P.C.

(57) ABSTRACT

Methods and systems of determining and controlling a vehicle travel speed on a roadway determine a grade of the roadway at defined intervals along the roadway; calculate a maximum straight line vehicle speed for each defined interval based on the determined grade and vehicle performance data; determine a radius of curvature and a superelevation of the roadway for each defined interval; determine a lateral friction coefficient for a vehicle/roadway system; calculate a maximum cornering vehicle speed for each defined interval based on the curvature, superelevation, and lateral friction coefficient; calculate the travel speed for each defined interval based on the maximum straight line vehicle speed and the maximum cornering vehicle speed; and control the speed of the vehicle so that it does not exceed the calculated travel speed for each defined interval.

29 Claims, 11 Drawing Sheets

(56) References Cited

U.S. PATENT DOCUMENTS

2012/0277965 A1    11/2012  Takahashi et al.
2017/0158225 A1*  6/2017  Brown ................. G05D 1/0255

OTHER PUBLICATIONS

Kolmanovsky et al., "Terrain and Traffic Optimizet Vehicle Speed Control," IFAC, Jul. 14, 2010, retrieved on [May 15, 2021]. Retrieved from the internet <URL: https://wwwsciencedirect.com/science/artificial/pii/S1474667015368580>, pp. 378-383.

* cited by examiner

| DIRECTION OF TRAVEL | GRADE | PAYLOAD STATUS | FLEET | RIMPULL SPEED LIMIT | CURVE SPEED LIMIT | OPERATIONAL CONSTRAINT LIMIT | UN BUFFERED SPEED LIMIT | FINAL SPEED LIMIT | LIMITING FACTOR | TARGET TRANSMISSION GEAR |
|---|---|---|---|---|---|---|---|---|---|---|
| CR3102\|CR3103 | 2.2 | TRAVEL LOADED | CAT 793B | 17.4 | | 17.4 | 17.4 | 16.5 | int_accel | 4TH FORWARD |
| CR3102\|CR3103 | 2.2 | TRAVEL LOADED | CAT 793B | 17.4 | | 17.4 | 17.4 | 16.5 | int_accel | 4TH FORWARD |
| CR3102\|CR3103 | 2.2 | TRAVELING EMPTY | CAT 793B | 33.5 | | 24.2 | 24.2 | 23.0 | int_accel | 5TH FORWARD |
| CR3102\|CR3103 | 2.2 | TRAVELING EMPTY | CAT 793B | 33.5 | | 25.2 | 25.2 | 23.9 | int_accel | 5TH FORWARD |
| CR3102\|CR3103 | 2.2 | TRAVEL LOADED | CAT 793B | 17.4 | | 17.4 | 17.4 | 16.5 | rimpull | 4TH FORWARD |
| CR3102\|CR3103 | 2.2 | TRAVEL LOADED | CAT 793B | 17.4 | | 17.4 | 17.4 | 16.5 | rimpull | 4TH FORWARD |
| CR3102\|CR3103 | 2.2 | TRAVEL LOADED | CAT 793B | 17.4 | | 17.4 | 17.4 | 16.5 | rimpull | 4TH FORWARD |
| DSP103\|DSP104 | 2.2 | TRAVEL LOADED | CAT 793B | 17.4 | | 17.4 | 17.4 | 16.5 | rimpull | 4TH FORWARD |
| DSP103\|DSP104 | 2.2 | TRAVELING EMPTY | CAT 793B | 33.5 | | 26.1 | 26.1 | 24.8 | acceleration | 5TH FORWARD |
| CR3102\|CR3103 | 2.2 | TRAVELING EMPTY | CAT 793B | 33.5 | | 26.1 | 26.1 | 24.8 | acceleration | 5TH FORWARD |
| DSP113\|DSP114 | 2.2 | TRAVELING EMPTY | CAT 793B | 33.5 | 14.8 | 14.8 | 14.8 | 14.0 | curve | 4TH FORWARD |
| DSP113\|DSP114 | 2.2 | TRAVELING EMPTY | CAT 793B | 33.5 | 14.8 | 14.8 | 14.8 | 14.0 | curve | 4TH FORWARD |
| DSP113\|DSP114 | 2.2 | TRAVELING EMPTY | CAT 793B | 33.5 | 14.8 | 14.8 | 14.8 | 14.0 | curve | 4TH FORWARD |
| DSP113\|DSP114 | 2.2 | TRAVELING EMPTY | CAT 793B | 33.5 | 14.8 | 14.8 | 14.8 | 14.0 | curve | 4TH FORWARD |

FIG. 11

METHODS AND SYSTEMS FOR DETERMINING AND CONTROLLING VEHICLE SPEED

CROSS-REFERENCE TO RELATED APPLICATION

This application claims the benefit of U.S. Provisional Patent Application No. 62/990,522, filed on Mar. 17, 2020, which is hereby incorporated herein by reference for all that it discloses.

TECHNICAL FIELD

The present invention relates to mining operations in general and more particularly to methods and systems for determining and controlling maximum travel speed for an off-road vehicle.

BACKGROUND

Mining operations typically involve the delivery of large amounts of earthen materials, such as excavated ore, to various types of material processing systems to recover metals or other valuable minerals. Such further processing may involve one or more comminution or size-reduction steps to reduce the size of the excavated ore from a relatively coarse size to a finer size suitable for subsequent processing. Thereafter, the size-reduced ore may be subjected to any of a wide range of processes to separate the commercially valuable minerals from the waste material or gangue.

In a typical open-pit mining operation, the ore to be mined is periodically fractured (e.g., by blasting). Large shovels are then used to load the fractured ore into haul trucks. The haul trucks carry the excavated ore to various other locations throughout the mine for further comminution and/or processing. Such other locations may include one or more ore crushers, grinders, stockpiles, and waste dumps, just to name a few. Open-pit mining operations are conducted on a large scale and a given open pit mine may involve the use of a large number of shovels, haul trucks, and processing systems in order to process the large volumes of excavated ore involved.

The overall efficiency of the mining operation is based in part on the efficiency of the equipment used to deliver the excavated ore to the various locations for further processing. Part of that overall efficiency involves the speeds at which the empty and loaded haul trucks travel between the various material loading and unloading areas within the mine. Excessive travel speeds may create safety and equipment reliability issues, whereas slower travel speeds can result in reduced productivity. Moreover, because most mining operations involve a large number of haul trucks, variations in the travel speeds among the haul trucks traversing the same road segments can result in increased traffic congestion, bottlenecks, breakdowns, and increased idle or wait times at the various loading and unloading areas, all of which can significantly reduce productivity.

In a typical mining operation, maximum vehicle speeds are usually posted as speed limits at various locations along the mine roadway system. However, the speed limits are usually based on certain defined conditions for the haul trucks and roadways. For example, speed limits may be based on a haul truck traveling in a loaded state and with the mine road under dry, recently graded conditions. Consequently, the posted speed limits may be too high when the conditions of the roadways are less than ideal, such as might occur during rain or snow, or due to the deterioration of the surface of the roadways over time. Of course, if the posted speed limits are based on less than ideal roadway conditions, they may be too low when the roadways are in good condition.

Another difficulty associated with determining the appropriate speed limits for the haul trucks relates to the fact that the mining environment is a dynamic one and the mine roads are frequently moved or rerouted and/or new mine roads added as the mining operation progresses. Therefore, even if the appropriate maximum speed limits happen to be obtained for each portion or segment of the roadway system, new speed limits will need to be developed and posted for the changed and new roadways.

SUMMARY OF THE INVENTION

A method of determining and controlling a vehicle travel speed on a roadway may include the steps of: Determining a grade of the roadway at defined intervals along the roadway; calculating a maximum straight line vehicle speed for each defined interval based on the determined grade and vehicle performance data; determining a radius of curvature and a superelevation of the roadway for each defined interval; determining a lateral friction coefficient for a vehicle/roadway system; calculating a maximum cornering vehicle speed for each defined interval based on the curvature, superelevation, and lateral friction coefficient; calculating the travel speed for each defined interval based on the maximum straight line vehicle speed and the maximum cornering vehicle speed; and controlling the speed of the vehicle so that it does not exceed the calculated travel speed for each defined interval.

One embodiment of a system for determining a travel speed for a vehicle traveling on a roadway may include a road grade tool that determines a grade of a roadway at defined intervals along the roadway based on sensor data from the vehicle. A straight line speed tool calculates a maximum straight line vehicle speed for each defined interval based on the determined grade from the road grade tool and vehicle performance data. A road curvature tool calculates a road curvature and superelevation based on sensor data from the vehicle, whereas a friction tool determines a lateral friction coefficient between the vehicle and the roadway. A cornering speed tool calculates a maximum cornering vehicle speed for each defined interval based on the curvature, superelevation, and lateral friction coefficient. A processing system operatively associated with the road grade tool, the straight line speed tool, the road curvature tool, the friction tool, and the cornering speed tool calculates a travel speed for each defined interval based on the maximum straight line vehicle speed and the maximum cornering vehicle speed. A vehicle speed control system operatively associated with the processing system controls the speed of the vehicle so that it does not exceed the calculated travel speed for each defined interval.

A computer implemented method of determining a vehicle travel speed on a roadway may include the steps of: Determining a grade of the roadway at defined intervals along the roadway; calculating, using the computer, a maximum straight line vehicle speed for each defined interval based on the determined grade and vehicle performance data; determining a radius of curvature and a superelevation of the roadway for each defined interval; determining a lateral friction coefficient for a vehicle/roadway system; calculating, using the computer, a maximum cornering vehicle speed for each defined interval based on the curvature, superelevation, and lateral friction coefficient; and calculating, using the computer, the travel speed for the vehicle for each defined interval based on the maximum straight line vehicle speed and the maximum cornering vehicle speed.

Also disclosed is a non-transitory computer-readable storage medium having computer-executable instructions embodied thereon that, when executed by at least one computer processor cause the computer processor to: Determine a grade of the roadway at defined intervals along the roadway; calculate a maximum straight line vehicle speed for each defined interval based on vehicle performance data and the determined grade; determine a radius of curvature and a superelevation of the roadway for each defined interval; determine a lateral friction coefficient for a vehicle/roadway system; calculate a maximum cornering vehicle speed for each defined interval based on the curvature, superelevation, and lateral friction coefficient; calculate a vehicle speed for each defined interval based on the maximum straight line vehicle speed, the maximum cornering vehicle speed; and present the calculated vehicle speed for each defined interval in a user-discernible form.

BRIEF DESCRIPTION OF THE DRAWINGS

Illustrative and presently preferred exemplary embodiments of the invention are shown in the drawings in which:

FIG. 11 is a pictorial representation of a sample display of maximum vehicle speed and other data produced by the systems of the present invention.

DETAILED DESCRIPTION OF THE PREFERRED EMBODIMENTS

Figure 1:
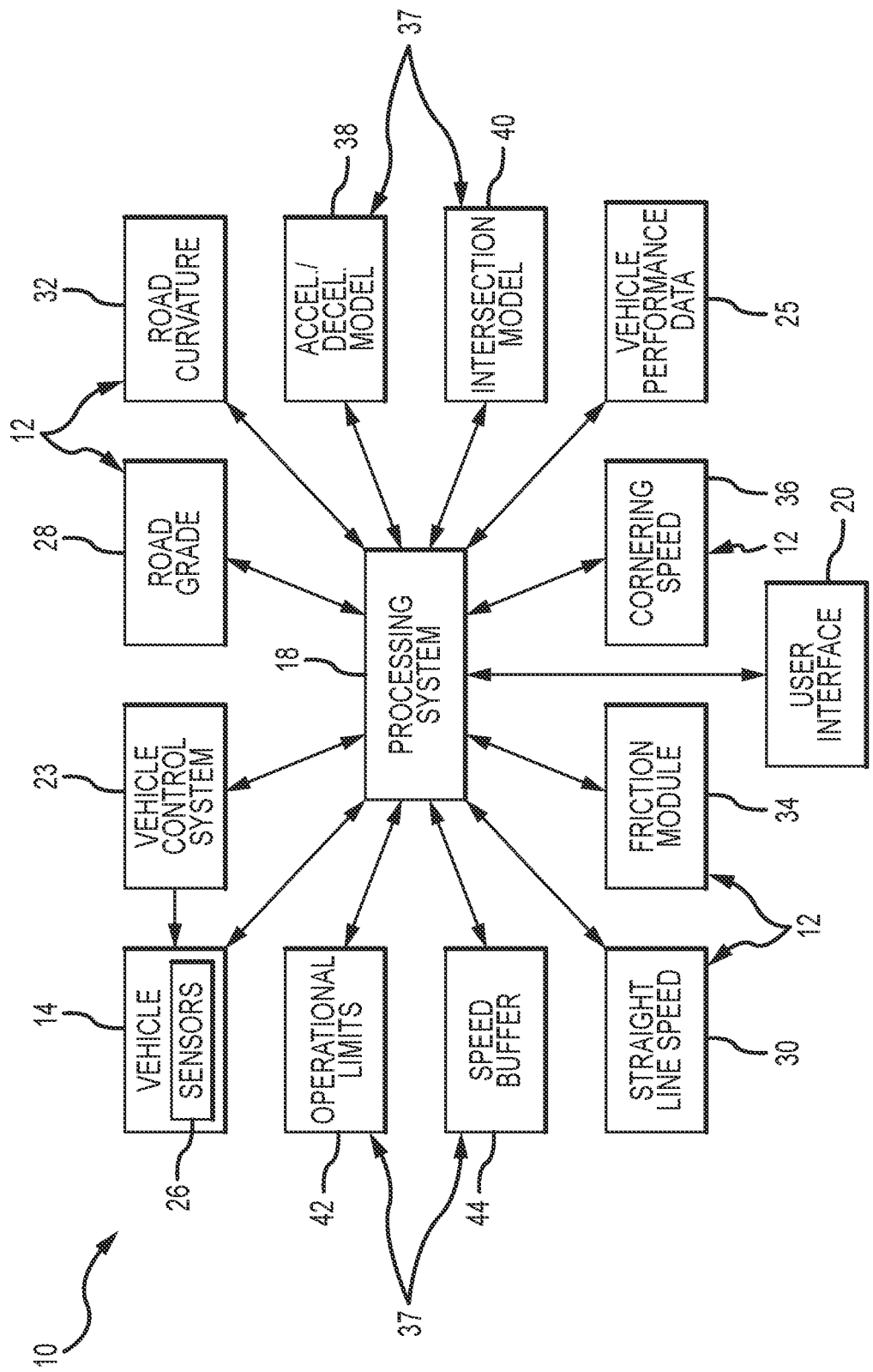
FIG. 1 is a schematic representation of a travel speed determination and control system according to one embodiment of the invention.
Figure 2:
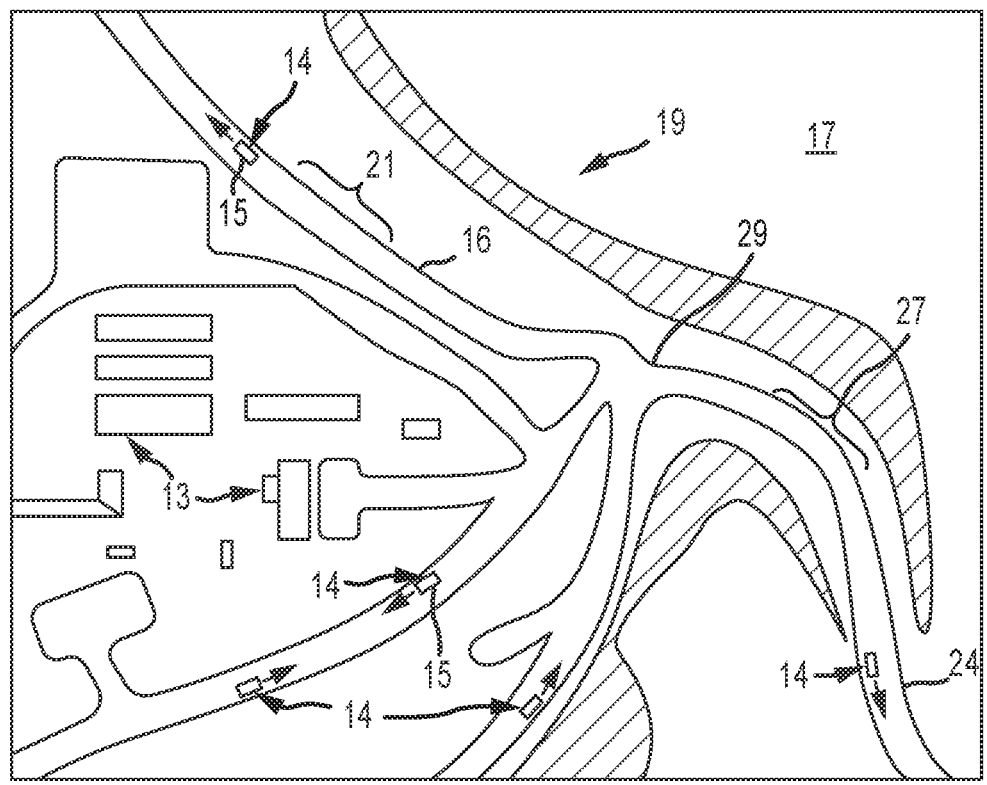
FIG. 2 is a schematic representation of a portion of an operational area in a mining operation showing portions of the road network, buildings, curves and intersections, and vehicles moving along the various roadways.
Figure 3:
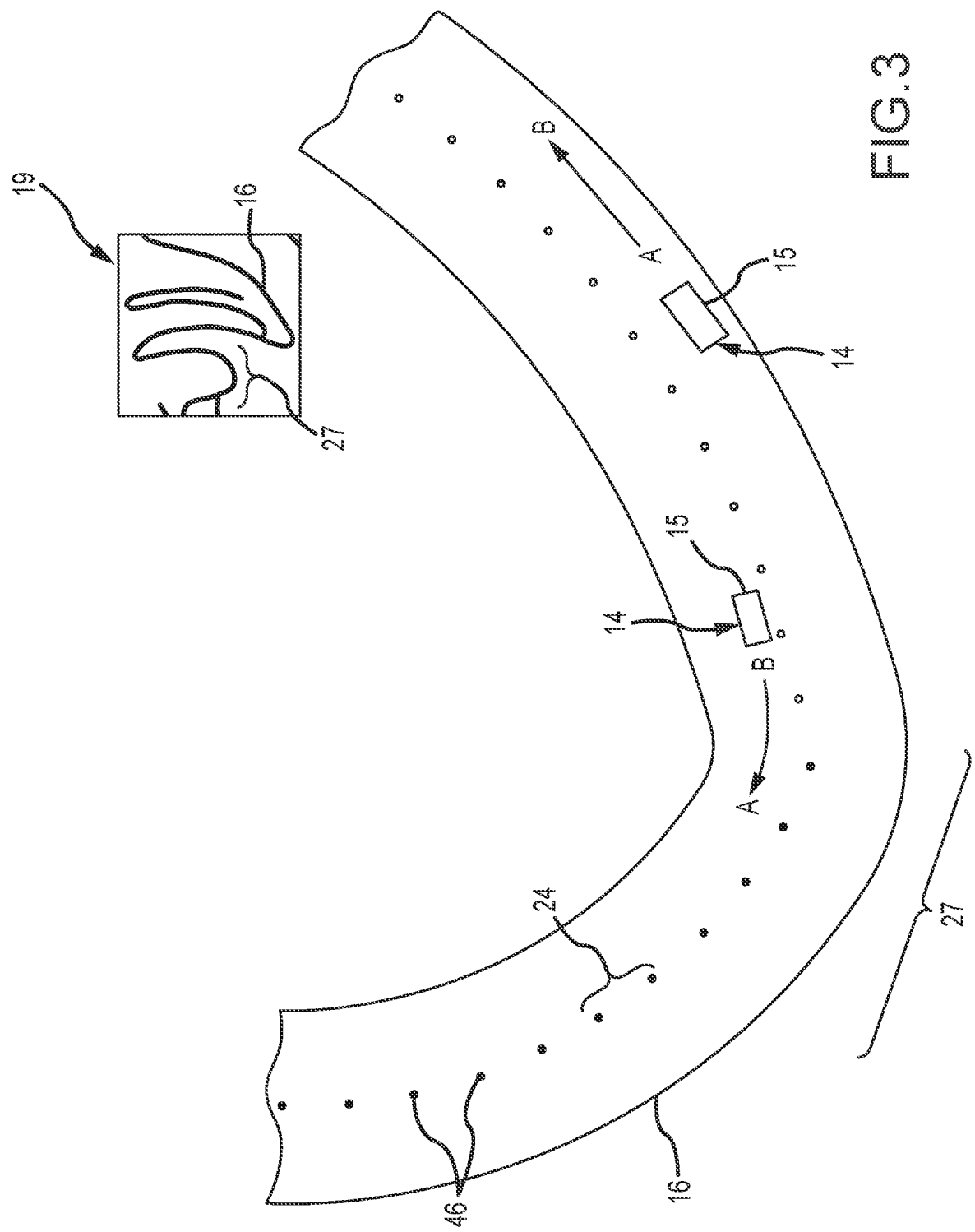
FIG. 3 is a pictorial representation of a portion of a curved section of a roadway showing a plurality of snap points that define a plurality of defined intervals along the roadway.

One embodiment of a system 10 for determining and controlling travel speeds of vehicles is best seen in FIGS. 1-3 as it could be used to determine and control travel speeds for one or more vehicles 14, such as haul trucks 15 traveling along roadways 16 in an open pit mining operation 18. Travel speed system 10 may comprises a number of tools or modules 12 that are accessed or implemented by a computer processing system 18 to determine travel speeds for the vehicles 14 for each of a plurality of defined intervals 24 along the roadways 16. In the particular embodiments shown and described herein, the travel speeds determined by the travel speed system 10 represent maximum achievable speeds for particular vehicle types and loading conditions based on the specific characteristics of the particular defined interval 24 of each roadway 16.

In addition to determining maximum travel speeds for each particular defined interval 24, the system 10 may also be used to determine maximum travel speeds on a frequent, or even a substantially continuous, basis to account for changing conditions. Such changing conditions may include weather conditions (e.g., rain, snow, fog, etc.), road conditions (e.g., due to weather or even road wear), road geometry, route, location, etc. (e.g., due to the ever-changing nature of the mining operation), and even changes to the fleet of vehicles 14.

Computer processing system 18 of vehicle travel speed system 10 also may be operatively connected to a user interface system 20, a source or database of vehicle performance data 25, and one or more sensors 26 operatively associated with each vehicle 14, e.g., haul truck 15. User interface system 20 allows a user or fleet manager (not shown) to input various data and information into the computer processing system 18, as will be described in further detail herein. Processing system 18 may also receive information and data captured by one or more of the vehicle sensors 26 operatively associated with each vehicle 14. As will be described in much greater detail herein, the information and data from the vehicle sensors 26 may be used by the travel speed system 10 to determine the maximum travel speeds 14 for each defined interval 24 along the roadways 16. In one embodiment, the maximum travel speeds may be presented in user-discernable form on display system (not shown) operatively associated with user interface system 20, as depicted in FIG. 11. Other information and data may be presented as well, as also depicted in FIG. 11. Travel speed system 10 may also include a vehicle speed control system 23 operatively associated with processing system 18 and vehicles 14. As will be described in greater detail herein, vehicle speed control system 23 may be used to control the speed of each vehicle 14 so that it does not exceed the maximum travel speed for each defined interval 24.

The various modules or tools 12 comprising the travel speed determination system 10 may include a road grade tool or module 28, a straight line speed tool 30, a road curvature tool 32, a friction tool 34, and a cornering speed tool 36. Travel speed system 10 may also include a number of models 37 to improve the accuracy of the maximum travel speeds determined by system 10. In the particular embodiments shown and described herein, such models 37 may include an acceleration/deceleration model 38, an intersection model 40, an operational limits model 42, and a speed buffer model 44.

Briefly described, the road grade tool 28 determines a grade or slope (i.e., incline or decline) for each defined interval 24 along roadway 16. See FIG. 3. In some embodiments the defined intervals 24 may be spaced substantially equally along the roadway 16 and may have lengths of about 9.1 m (about 30 feet). The road grade tool 28 determines the grade of each defined interval 24 along roadway 16, thereby providing a highly "granular" assessment of the grade of the roadway 16. As will be described in greater detail below, the road grade tool 28 determines the grade of each defined interval 24 based on location data (e.g., position and altitude data) received from the sensor systems 26 associated with the vehicles 14.

Because the roadways 16 in a typical mine have a significant width (many are 2-lane travel, as depicted in FIG. 3), the road grade tool 28 determines the grade or slope for each defined interval 24 based on location (e.g., position and altitude) information provided by the vehicle sensing system 26 when the vehicles 14 (e.g., haul trucks 15) are traveling in two different (e.g., opposite) directions on the roadway 16, as depicted in FIG. 3. This approach accounts for differences in location values from vehicles 14 traveling in the inner vs. outer lane at curves 27 in the roadway 16. It also corrects for bias from vehicles 14 traveling empty vs. traveling loaded.

The straight line speed module 30 calculates a maximum straight line vehicle speed for each defined interval 24 based on the grade determined by the road grade tool 28 and the vehicle performance data 25. Vehicle performance data 25 may include the maximum achievable speeds under various defined conditions provided by the original equipment manufacturer (OEM) of the vehicle 14. Using the vehicle performance data 25 and determined road grade, the straight line speed module 30 calculates the maximum achievable straight line vehicle speed for each defined interval 24. Alternatively, and as will be described in greater detail below, some or all of the straight line vehicle speed calculation may be based on actual performance data collected from actual vehicles 14 operating in the mine 17, rather than on data provided by the vehicle manufacturer. For example, it is not unusual for the performance of an actual vehicle 14 to vary from manufacturer-supplied data. In such instances, use of actual vehicle performance data will result in a more accurate straight line vehicle speed calculation.

The road curvature tool 32 calculates a road curvature (e.g., curve radius) and "superelevation" (e.g., the bank angle) for each defined interval 24. In one embodiment, the calculation is based on location data obtained from the vehicle sensing system 26 in the manner already described. The superelevation may be determined based on the strut differential pressure data which may also be obtained from the vehicle sensing system 26 in a manner that will be described in greater detail below.

The friction tool 34 is used to calculate or determine the coefficient of lateral friction for the vehicle tire/roadway system for each curve in the roadway 16. In order to reflect the constantly changing road conditions, the coefficient of lateral friction may be obtained from the fastest observed (i.e., actual) vehicle speeds on the curves and the calculated superelevation. The cornering speed tool 36 calculates the maximum cornering vehicle speed for each defined interval 24 based on the curvature, superelevation, and lateral friction coefficient.

The vehicle speed system 10 also may be provided with a plurality of models 37 to increase the accuracy of the maximum travel speed determination made in accordance with the various modules and tools 12 just described. In one embodiment, an acceleration/deceleration model 38 is used to account for the acceleration and deceleration capabilities of the vehicle 14. An intersection model 40 accounts for variations in visibility, traffic, and interference around road intersections 29. See FIG. 2. An operational limits model 42 allows the system 10 to modify the maximum speed determination in view of any site-specific restrictions or practices. A speed buffer model 44 allows the vehicle speed system 10 to account for variations in vehicle speed that may be the result of measurement errors (e.g., vehicle speed as sensed by the vehicle sensor system 26) or the normal operation of vehicle systems.

Figure 4:
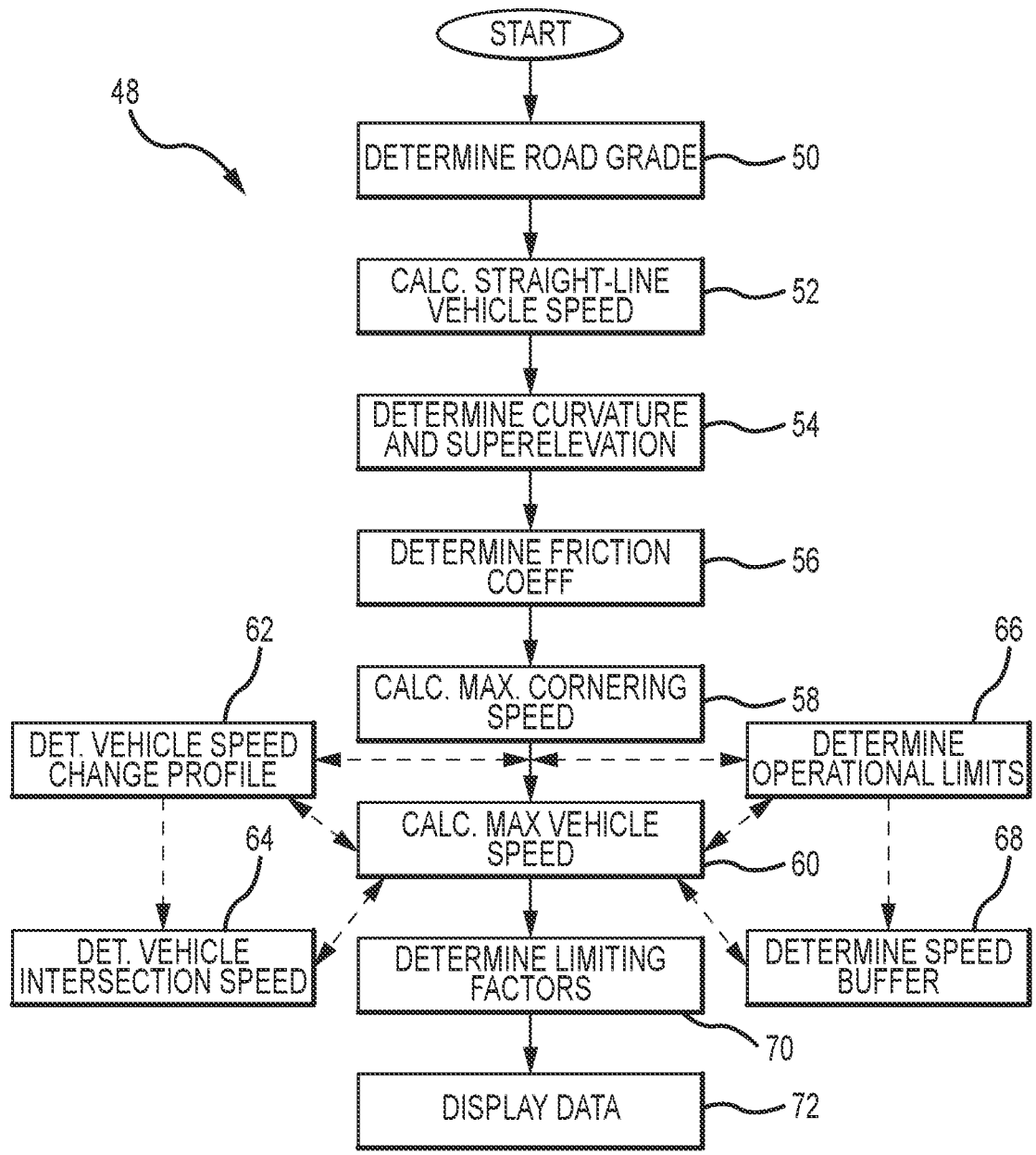
FIG. 4 is a flow chart representation of one embodiment of a method for determining and controlling vehicle travel speed according to one embodiment of the invention.

Referring now primarily to FIG. 4, the travel speed system 10 may operate in accordance with a method 48 to determine a maximum travel speed for a vehicle 14 for each defined interval 24 of roadway 16. A first step 50 in method 48 involves determining a grade of the roadway 16 for each defined interval 24 along the roadway 16. Step 50 may be performed in conjunction with the road grade tool or module 28 in the manner already described. Step 52 involves calculating the maximum straight line vehicle speed for each of the defined intervals 24. The straight line speed is determined or calculated based on the determined grade (e.g., from step 50) and the vehicle performance data 25.

Step 54 determines or calculates the radius of curvature and the superelevation of curved portions of the roadway 16. Step 54 is performed in conjunction with the road curvature tool 52. Friction tool 34 is then used to perform step 56 in which the lateral friction coefficient is determined for the vehicle/roadway system. Thereafter, step 58 calculates the maximum vehicle cornering speed for each defined interval 24 based on the curvature, superelevation, and lateral friction coefficient. Step 58 is performed in conjunction with the cornering speed tool 36. Step 60 of method 48 calculates a maximum vehicle speed for each defined interval 24 based on the maximum straight line vehicle speed and the maximum cornering speed. For example, if the straight line vehicle speed exceeds the maximum cornering speed (e.g., for curved sections 27 of the roadway 16) for a given defined interval 24, then the maximum vehicle speed will be determined to be equal to the maximum cornering speed. On the other hand, if the defined interval 24 is on a straight section of roadway 16, then the maximum vehicle speed will be determined to be equal to the maximum straight line vehicle speed.

Method 48 may also include additional optional steps if the vehicle speed system 10 is provided with the additional models 37. For example, method 48 may also include step 62 that determines a vehicle speed change profile based on the acceleration/deceleration model 38. Step 64 may involve determining a vehicle intersection speed based on the intersection model 40. In such an embodiment, the step 60 of calculating a maximum vehicle speed for each defined interval will be based on the maximum straight line vehicle speed, the maximum cornering vehicle speed, the vehicle speed change profile, and the vehicle intersection speed.

In embodiments involving an operational limits model 42, method 48 may include step 66 which determines operational limits for the roadway which may limit the maximum vehicle speed calculated in step 60. Similarly, if a speed buffer model 44 is provided, then method 48 may also include step 68 which determines a speed buffer for the vehicle 14. The speed buffer is then used in step 60 to calculate the maximum vehicle speed.

Thereafter, step 70 may be performed which determines a limiting factor for the maximum vehicle speed. That is, for each defined interval 24, the vehicle speed system 10 may determine and display for a user the limiting factor for the maximum speed determination. Limiting factors could include, but are not limited to, acceleration, deceleration, road curvature, intersection speed limit, operational limits, or travel speed buffers.

Step 72 may involve the display of various information and data produced by method 48, e.g., on a display (not shown) operatively associated with user interface system 20. For example, and with reference now to FIG. 11, in addition to displaying the maximum vehicle speed for each defined interval 24 along the roadway 16 (indicated in FIG. 11 as the "Final Speed Limit") the system 10 may also display the limiting factor associated with the particular defined interval 24, i.e., the particular factor that drove the maximum speed determination for the defined interval 24. In some embodiments, the system 10 may also display the data in the form of a 'heat map' or depiction of the actual section of roadway 16 in which the actual travel speed of the vehicle 14 is compared with the maximum vehicle speed for the respective defined intervals 24. Vehicles 14 that are traveling at about the maximum vehicle speed may be depicted in a color green, whereas vehicles that are traveling more than a defined tolerance below the maximum vehicle speed may be depicted in a color red. Vehicles 14 traveling at speeds between may be depicted in a color yellow.

A significant advantage of the systems and methods of the present invention is that they may be used to calculate or determine maximum vehicle speeds not only for a roadway in general, but for a plurality of defined intervals along the roadway. Accordingly, the maximum speeds are calculated or determined based on speeds appropriate for individual sections of the roadway, whether they are straight, curved, inclined, declined, or define intersections. Moreover, the maximum speeds may be calculated on a frequent, nearly real-time basis, thereby allowing the systems and methods described herein to determine maximum vehicle travel speeds even in view of changing road or weather conditions. Moreover, the information and data input to the various modules 34 and/or models 37, as well as the calculations or computations performed by each module 34 and/or models 37 are automatically transferred or communicated among the various modules and models 34 and 37, thereby significantly streamlining the maximum speed determination process and significantly reducing the likelihood that errors will be inadvertently introduced. Furthermore the vehicle speed system 10 provides a rationalized basis for determining maximum vehicle speeds that is repeatable and predictable and minimizes variations due to guesswork or the uneven application of various methodologies to determine maximum safe vehicle speeds based on a wide range of factors.

Having briefly described certain exemplary embodiments of systems and methods of the present invention, as well as some of their more significant features and advantages, various embodiments and variations of the systems and methods of the present invention will now be described in detail. However, before proceeding the description, it should be noted that while the various embodiments are shown and described herein as they could be used in an open pit mining operation to determine maximum speeds for haul trucks, the present invention is not limited to use in conjunction with mining applications. To the contrary, the present invention could be used in any of a wide range of applications that involve the need to determine maximum speeds for vehicles that take into account variations in a wide range of factors, as would become apparent to persons having ordinary skill in the art after having become familiar with the teachings provided herein. Consequently, the present invention should not be regarded as limited to use in any particular type of application, environment, or equipment.

Referring back now primarily to FIGS. 1 and 2, the various embodiments of a system 10 for determining and controlling maximum travel speeds of vehicles are shown and described herein as they could be used in a mining operation 17 to determine and control a maximum travel speed of one or more vehicles 14 (e.g., haul trucks 15) traveling along roadways 16 comprising a mine road network 19. The mine road network 19 allows the vehicles 14 to travel between various service areas 13 and loading and dumping areas (the loading and dumping areas are not shown in FIG. 2) associated with the mining operation 17. Roadways 16 may include various straight sections 21, curved sections 27, and intersections 29. The roadways 16 may be graded (i.e., inclined from the horizontal) or flat (i.e., level or horizontal). Some curved sections 27 of the roadways 16 may be banked, while others may be unbanked.

The maximum travel speed system 10 may be implemented by, or in conjunction with, computer processing system 18. When so implemented, the travel speed system 10 may comprise an integrated system in which the various tools or modules 12 may be accessed to determine maximum travel speeds for the vehicles 14 for each of a plurality of defined intervals 24 along the roadways 16.

Before proceeding with the description it should be noted that the particular configuration and architecture of the system 10 shown in FIG. 1 is illustrative only and serves to depict one possible interoperative arrangement of the various tools/modules 12 and models 37 comprising system 10. However, persons having ordinary skill in the art will readily recognize that other configurations and architectures are possible and could be utilized to achieve the same functionalities and interoperabilities described herein. Consequently, the present invention should not be regarded as limited to the particular configuration or architecture of the various tools/modules 12 and models 37 shown and described herein.

Continuing now with the description, processing system 18 may be operatively connected to a user interface system 20, a database of vehicle performance data 25, and one or more sensors 26 operatively associated with each vehicle 14. Processing system 18 may therefore receive and transmit information and data from, to, and among the various tools/modules, models 37, and other systems in the manner described herein. In some embodiments, the processing system 18 may comprise one or more computer processors that are configured to perform the functions and data processing steps described herein.

User interface system 20 allows a user or fleet manager (not shown) to input various data and information into the computer processing system 18 in the manner described herein. User interface system 20 may comprise any of a wide range of user interfaces, such as keyboards, pointers, and displays that are now known in the art or that may be developed in the future that are or would be suitable for use with the intended application. Similarly, the database of vehicle performance data 25 may comprise any of a wide range of systems, such as computer memory systems, that are now known in the art or that may be developed in the future that are or would be suitable for storing information and data associated with vehicle performance. However, because such user interface and database systems are well-known in the art and could be readily provided by persons having ordinary skill in the art after becoming familiar with the teachings provided herein, the particular user interface and database systems 20 and 25 that may be used on conjunction with the present invention will not be described in further detail herein.

Processing system 18 may also receive information and data captured by one or more of the vehicle sensors 26 operatively associated with each vehicle 14. As will be described in greater detail herein, information and data produced by the vehicle sensors 26 may include, but are not limited to, vehicle location data (e.g., position and altitude), vehicle speed, transmission gear selection, payload status, throttle position, and suspension differential pressure. Such information and data may be used by the travel speed system 10 to determine the maximum travel speeds 14 for each defined interval 24 along the roadways 16. As mentioned, the maximum travel speeds may be presented in user-discernable form on display system (not shown) operatively associated with user interface system 20. See FIG. 11. Of course, any of a wide range of other information and data may be presented in user-discernable form on display system as well, some of which are also illustrated in FIG. 11.

As mentioned earlier, system 10 may also include a vehicle speed control system 23 operatively associated with the vehicles 14 and processing system 18. Vehicle speed control system 23 may be used to control the speed of the vehicle 14 so that it does not exceed the maximum travel speed for each defined interval 24. In embodiments wherein the vehicles 14 are controlled by drivers, vehicle speed control system 23 could comprise a display system (not shown) provided in each vehicle 14 that displays the determined maximum vehicle speed for the particular interval being traversed by the vehicle 14. In other embodiments, the defined speed could be displayed on a display system posted alongside the roadway 16 and visible to the driver. In any event, the driver would then operate the vehicle 14 so as not to exceed the displayed maximum velocity. Alternatively, the driver could operate the vehicle 14 so that its speed is maintained within a defined tolerance of the displayed maximum velocity.

In embodiments wherein the vehicles 14 are autonomous or semi-autonomous, the system 10 could command a speed control system (not shown) operatively associated with the vehicle 14 to regulate the vehicle speed so as not to exceed the defined maximum velocity, or at least operate the vehicle so that its speed is maintained within a defined tolerance of the defined maximum velocity.

Still referring to FIG. 1, the various modules or tools 12 comprising the travel speed determination system 10 may include a road grade tool or module 28, a straight line speed tool 30, a road curvature tool 32, a friction tool 34, and a cornering speed tool 36.

Figure 5:
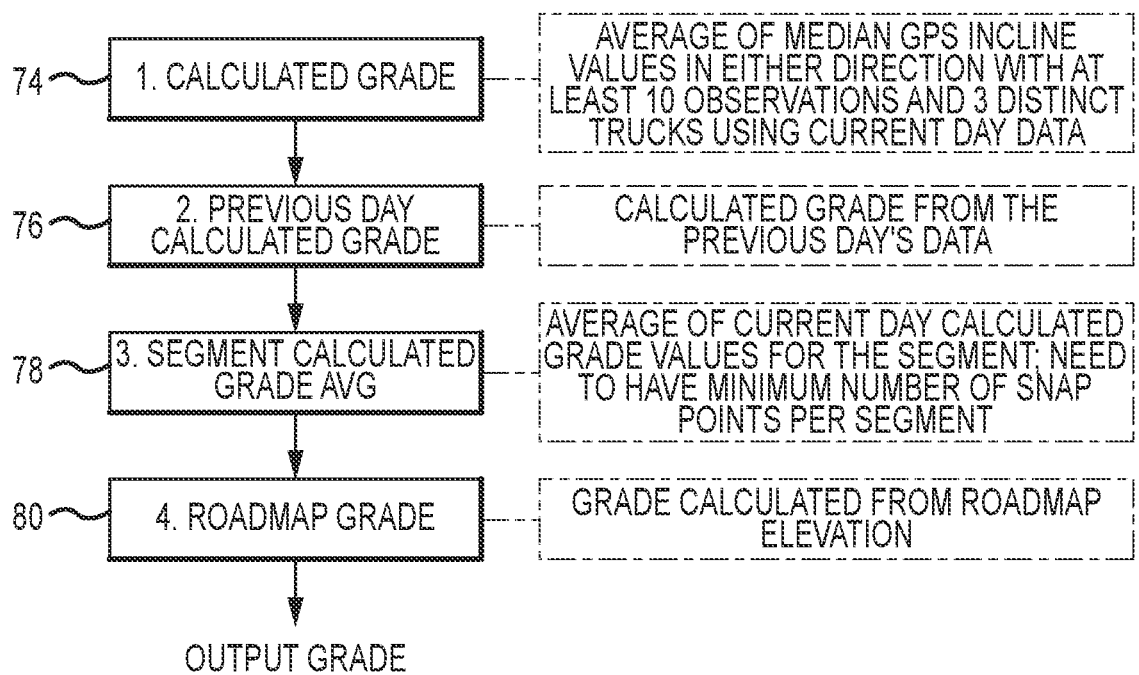
FIG. 5 is a schematic representation of a process used by the road grade tool to determine the grades of defined intervals of the roadways.

Referring now to FIGS. 3 and 5, road grade tool 28 determines the grade of each defined interval 24 along roadway 16. Road grade tool 28 determines the grade of each defined interval 24 based on location data (e.g., position and altitude data) received from the sensors 26 associated with vehicles 14. In one embodiment, the vehicle sensor system 26 may include a GPS sensor system (not shown) that provides position information (e.g., latitude and longitude) along with altitude information, all of which comprise the location information. While the location information may be used directly by system 10, it is generally preferred, but not required, to pre-process the position and altitude (i.e., location) information so that it may be more easily used by the road grade tool 28.

By way of example, and in the particular embodiments shown and described herein, the location data provided by the sensor system 26 of vehicle 14 may be pre-processed in accordance with the teachings provided in U.S. Pat. No. 10,712,448, entitled "Real-Time Correlation of Sensed Position Data with Terrestrial Features," which is specifically incorporated herein by reference for all that it discloses. Alternatively, the location data may be pre-processed in accordance with the teachings provided in U.S. Pat. No. 10,002,109, entitled "Systems and Methods of Correlating Satellite Position Data with Terrestrial Features," which is also specifically incorporated herein by reference for all that it discloses.

Briefly, the systems and methods described in U.S. Pat. Nos. 10,712,448 and 10,002,109 pre-process the location data by correlating sensed location data, i.e., provided by the vehicle sensors 26, with surveyed data associated with the various roadways 16 that make up the mine road network 19. The surveyed data associated with each roadway 16 may include the locations of the various snap points 46, as best seen in FIG. 3. The patents describe systems and methods for correlating or "snapping" the sensed location data from the vehicle sensors 26 to unique snap points 46 of the surveyed data. In the context of the present invention, such a correlation allows the locations of the various vehicles 14 to be readily correlated or 'snapped' to known snap points 46 on the roadway 16. The systems and methods described in the patents may be used to provide highly accurate and timely position data, typically within about 9 m (about 30 ft.) of the actual position of the vehicle 14. The position data are also updated at high frequency, typically once every second.

Referring back now to FIGS. 3 and 5 simultaneously, because the roadways 14 in a typical mine have a significant width (many are 2-lane travel), the road grade tool 28 determines or calculates the grade or slope 74 (FIG. 5) for each defined interval 24 based on location (e.g., position and altitude) information provided by the vehicle sensing system 26, e.g., as may be pre-processed in the manner described above, when the vehicles 14 are traveling in two different (e.g., opposite) directions on the roadway 16. See FIG. 3. For example, in one embodiment, the grade or slope is calculated at step 76 by taking the average of the median grades determined when the vehicle 14 is traveling in the "A" to "B" direction and the median grades determined when the vehicle 14 is traveling in the "B" to "A" direction. To improve accuracy, this grade determination may be made only when there are at least 10 'observations' or location values (e.g., position and altitude) from 3 unique vehicles 14 for each snap point 46. See FIG. 5. This approach accounts for difference in location values from vehicles 14, e.g., haul trucks 15, traveling in the inner vs. outer lane at curves in the roadway 16. The approach also corrects for bias from vehicles 14 traveling empty vs. traveling loaded. If these conditions are not met, then the road grade tool 28 instead uses at step 76 the calculated grade from the previous day.

At step 78, road grade tool 28 calculates the average grade for a defined segment of the roadway. Stated somewhat differently, in calculating the average of the current day's calculated road grade values for each segment of the roadway 16, the road grade tool 28 will need to have data for some defined minimum number of snap points 46 per segment. If there are insufficient data, then road grade tool 28 will use, at step 80, the road grade calculated from the survey data of road map elevation.

Figure 6B:
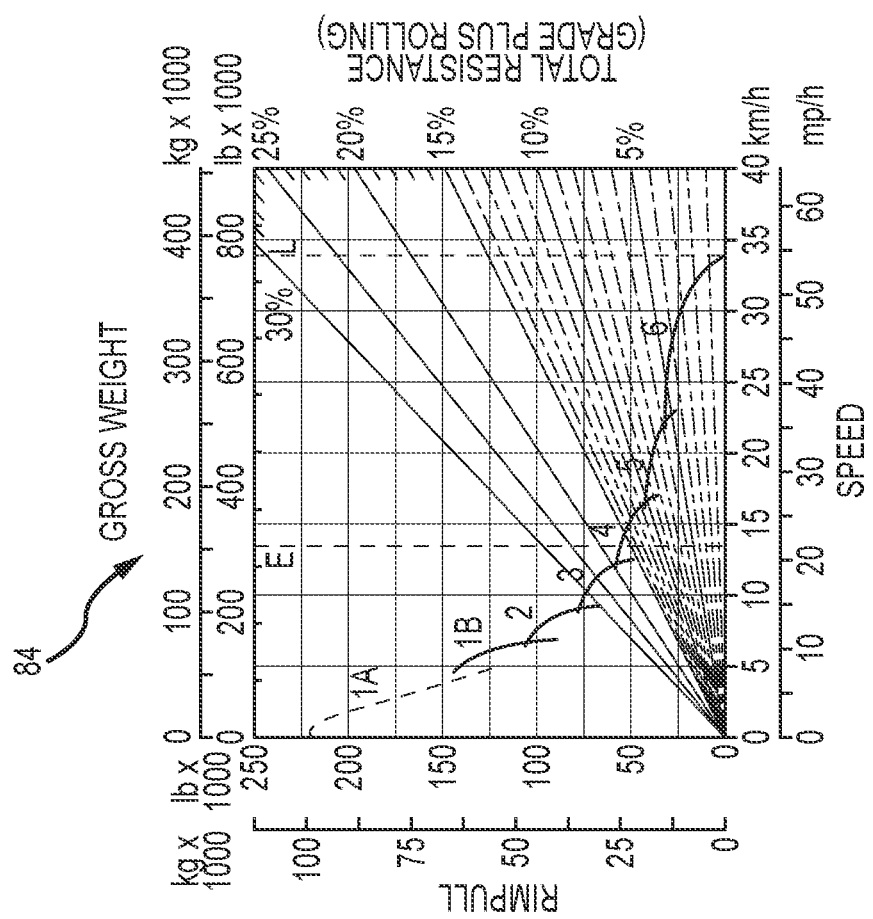
FIG. 6b is a plot of vehicle rimpull data for various road grades, vehicle speeds, and gross vehicle weights.
Figure 6A:
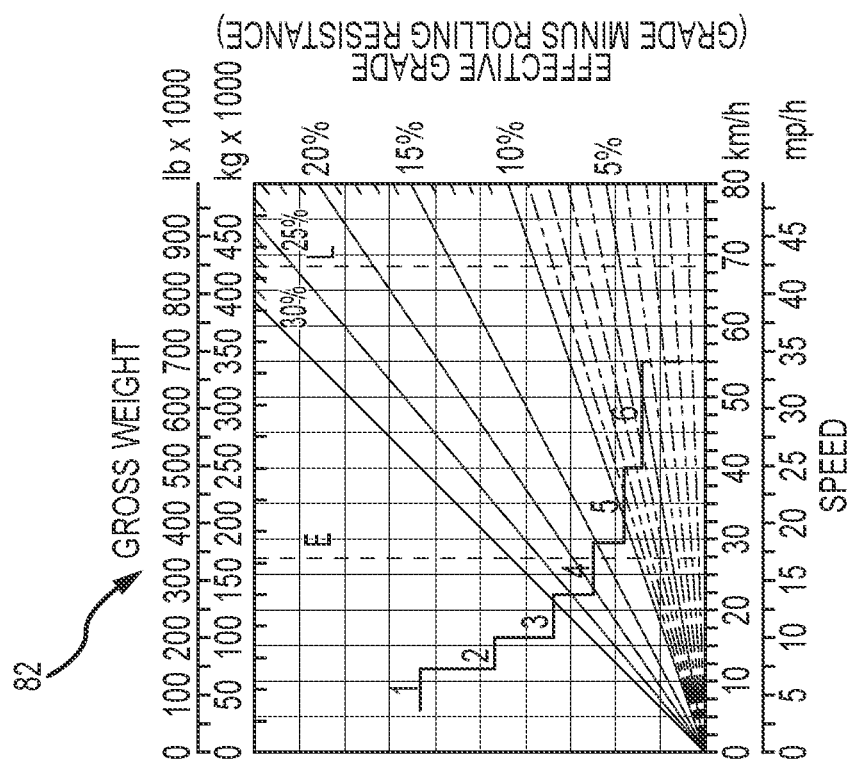
FIG. 6a is a plot of vehicle retarder system data for various road grades, vehicle speeds, and gross vehicle weights.
Figure 7B:
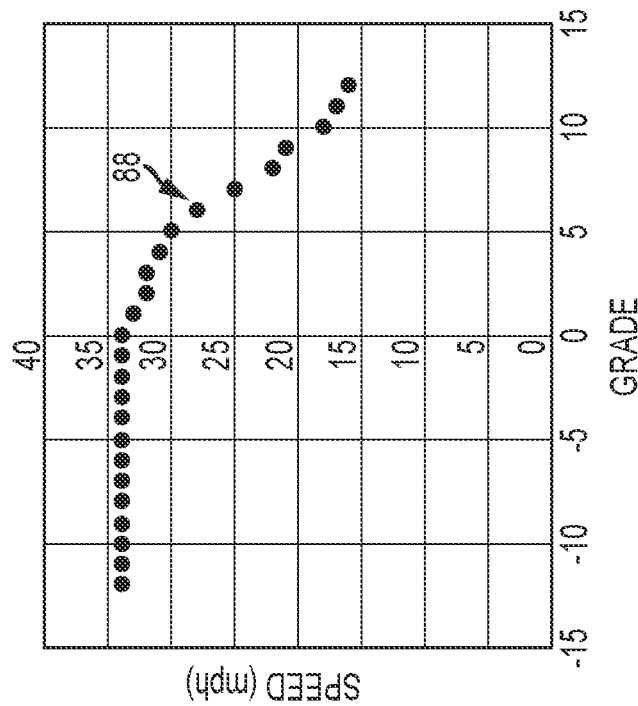
FIG. 7b is a plot of maximum achievable straight line speed vs. road grade determined by the straight line speed module for an empty haul truck.
Figure 7A:
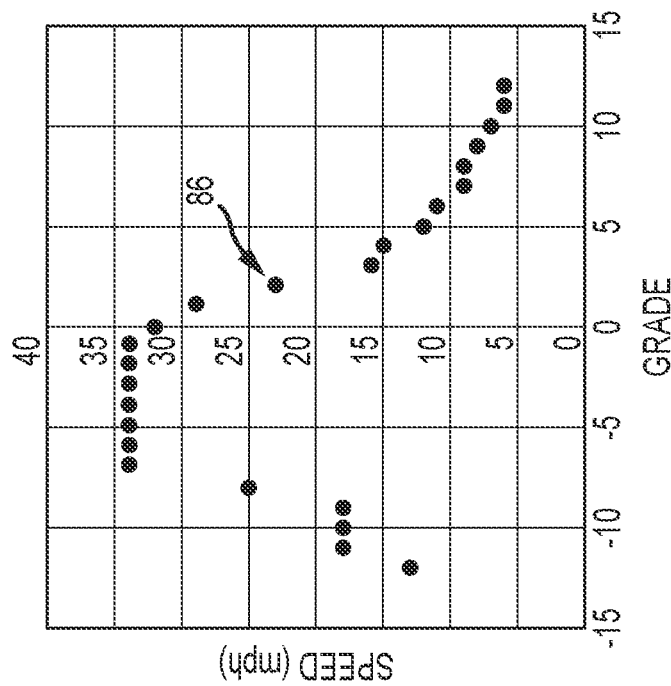
FIG. 7a is a plot of maximum achievable straight line speed vs. road grade determined by the straight line speed module for a loaded haul truck.

Referring now to FIGS. 6(*a,b*) and 7(*a,b*), the straight line speed module 30 calculates a maximum straight line vehicle speed for each defined interval 24 based on the determined grade from the road grade tool 28 and the vehicle performance data 25 (FIG. 1). Vehicle performance data 25 may include the maximum achievable speeds provided by the original equipment manufacturer (OEM) of the vehicle 14. The maximum achievable speeds provided by the manufacturer may be based upon gross vehicle weight (GVW) and gear selection. Vehicle performance data 25 may also include retarder data 82 associated with the retarder system (not shown) of the haul truck 15. See FIG. 6a. Retarder data are typically provided as the retarding or braking force per unit speed provided by the vehicle retarder system under various conditions, such as vehicle loading or gross vehicle weight (GVW), road grade, and transmission gear selection. The vehicle performance data 25 may also include rimpull data 84 illustrated graphically in FIG. 6b. Rimpull data is typically provided as the tractive force per unit speed provided by the vehicle propulsion system under various conditions, such as vehicle GVW, road grade, and transmission gear selection. Straight line speed module 30 uses retarder and rimpull data 82 and 84, as well as the road grade data provided by road grade tool 28, to calculate the maximum achievable straight line vehicle speed for each defined interval 24. A plot of maximum achievable straight line vehicle speeds 84 vs. road grade calculated by straight line speed module 30 for a loaded haul truck 15 is illustrated in FIG. 7a. Straight line speed module may also calculate straight line vehicle speeds 86 vs. road grade for an empty haul truck 15, a plot of which is shown in FIG. 7b.

Figure 8:
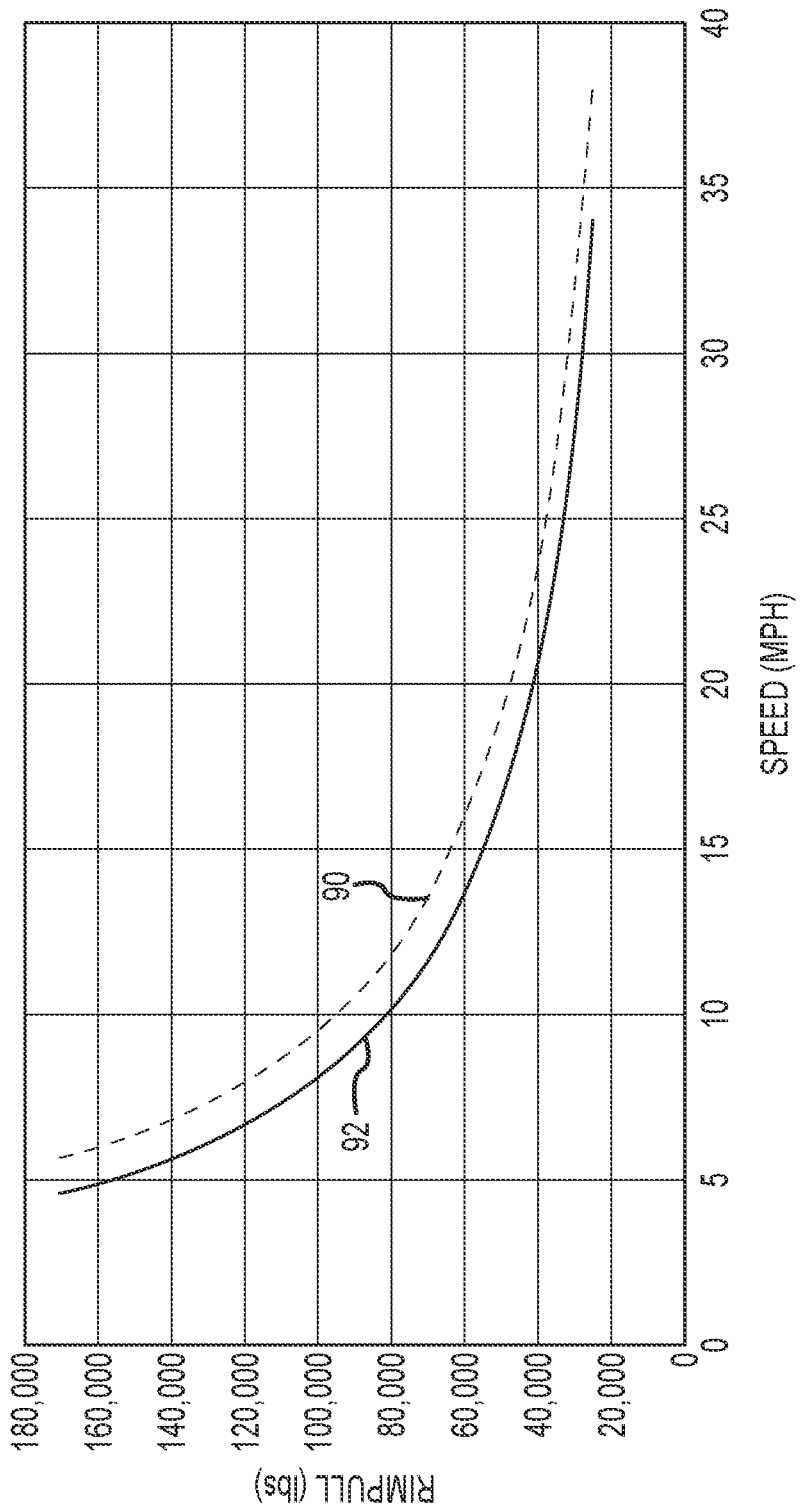
FIG. 8 is a plot of a calculated rimpull force vs. vehicle speed for an example haul truck compared to the rimpull force vs. speed obtained from data supplied by the vehicle manufacturer.

Instead of using retarder and rimpull data 82 and 84 provided by the vehicle manufacturer, some or all of the straight line vehicle speed calculations instead may be based on actual performance data collected from actual vehicles 14. For example, in many instances the performance of an actual vehicle 14 may vary from the OEM specifications. In such instances, use of actual vehicle performance data will result in a more accurate straight line vehicle speed calculation. For example, and with reference now to FIG. 8, actual rimpull data obtained from the haul truck 15 may be used to construct an actual rimpull curve 90. Rimpull curve 90 is a plot or graph of rimpull force vs. vehicle speed. The actual rimpull curve 90 may be determined from actual inverter torque feedback values provided by vehicle sensor system 26 associated with haul truck 15. In the particular example provided in FIG. 8, the actual rimpull curve 90 exceeds or outperforms an OEM rimpull curve 92 constructed from OEM rimpull data. Thus, the maximum achievable straight line speed calculation provided by straight line speed module 30 will be of improved accuracy for that particular haul truck 15.

Regardless of whether the vehicle performance data 25 comprise OEM or 'book' performance data or data obtained from actual vehicles 14 during operation, the straight line speed module 30 may calculate the maximum straight line speed for each type or model of vehicle 14 for specific road grades and payload conditions. Again, a plot 86 of exemplary calculated maximum vehicle straight line speed vs. road grade for a loaded haul truck is depicted in FIG. 7a. A plot 88 of exemplary calculated maximum vehicle straight line speed vs. road grade for an empty haul truck is depicted in FIG. 7b. In the particular embodiments shown and described herein, the straight line speed module 30 calculates maximum straight line speeds for every 1000 kg. of gross vehicle weight (GVW). Therefore, the straight line speed module 30 will be capable of determining maximum achievable straight line speeds for any of a wide range of loading conditions and road grades.

Figure 9:
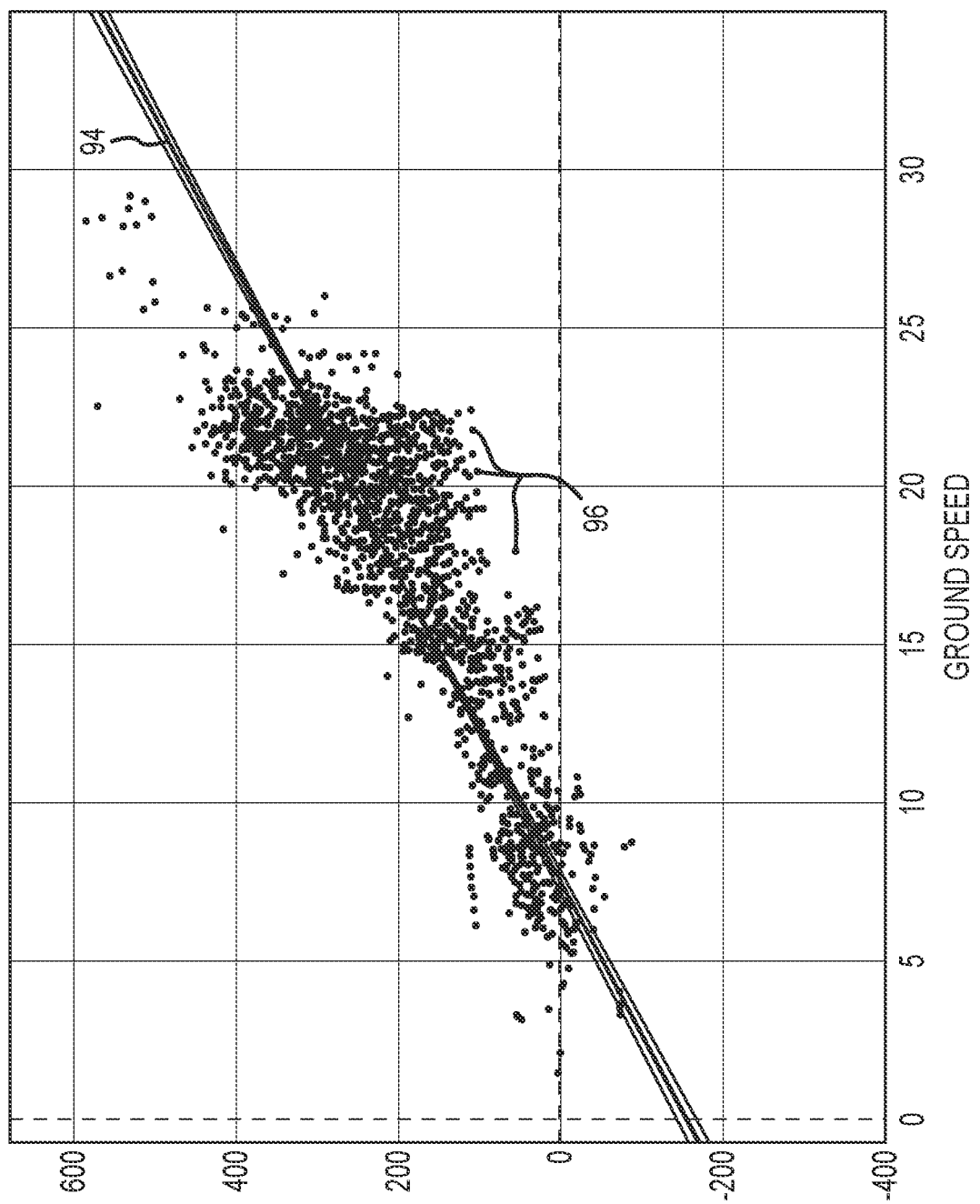
FIG. 9 is a plot of suspension strut pressure vs. vehicle speed that may be used to calculate a superelevation.

The road curvature tool 32 calculates a road curvature (e.g., curve radius) and "superelevation" (e.g., road bank angle) for each defined interval 24. In one embodiment, the calculation is based on location data obtained from the vehicle sensing system 26 in the manner already described. In one embodiment, the superelevation may be determined based on suspension strut differential pressure data obtained from the vehicle sensing system 26. For example, and with reference now to FIG. 9, the road curvature tool 32 fits a linear equation, represented by line 94, to a plot of left-right vehicle suspension strut pressures, represented by individual data or sampling points 96. The 'no-slip' speed is the speed at which the left-right vehicle suspension strut pressure is equal on both sides. At the no-slip speed the lateral forces are in balance as the vehicle negotiates the banked curve. Thereafter, the road curvature tool calculates the superelevation θ as follows:

$$\theta = v^2 / 15R \qquad (1)$$

where:
v=the no-slip speed (ft/s); and
R=the radius of the curve (ft).

The radius R of the curve may be obtained from the location information obtained from the vehicle sensing system 26 in the manner described above. Alternatively, the radius R may be determined from survey data of the road network 19.

The friction tool 34 is used to calculate or determine the coefficient of lateral friction for the vehicle/roadway system for each curve 27 of the roadway 16. In order to reflect the constantly changing road conditions, the coefficient of lateral friction $\mu_s$ may be obtained from the fastest observed (i.e., actual) vehicle speeds on the curves 27 and the calculated superelevation for each snap point as follows:

$$\mu_s = (v_{98}^2 \cos\theta - Rg\sin\theta) / (Rg\cos\theta + v_{98}^2 \sin\theta) \qquad (2)$$

where:
$v_{98}^2 = 98^{th}$ percentile observed speed of vehicles through the curve;
θ=the superelevation of the curve (from Eq. 1);
R=the radius of curvature of the curve; and
g=the acceleration due to gravity.

Figure 10:
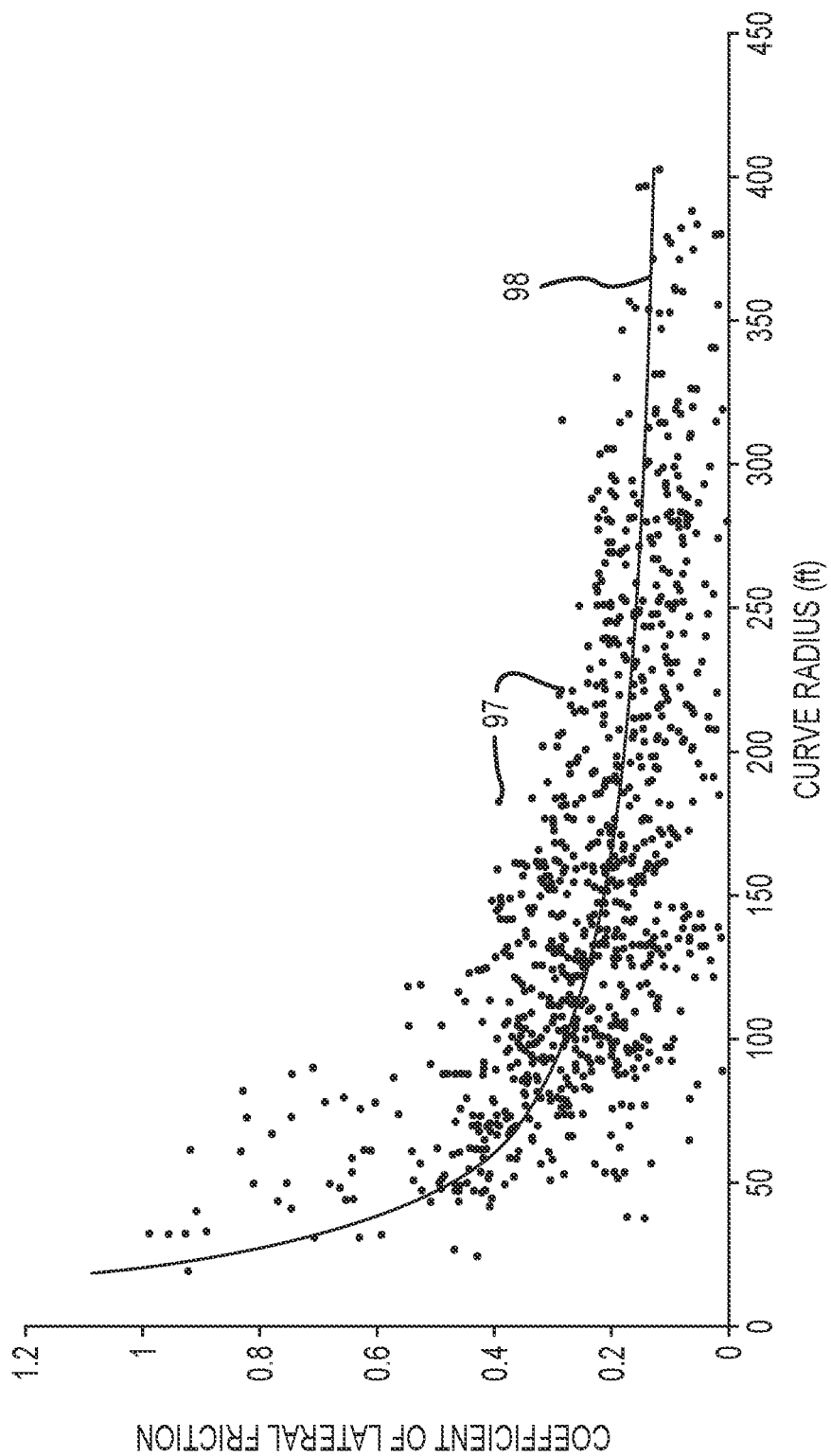
FIG. 10 is a plot of lateral friction coefficient vs. curve radius determined by the friction tool.

FIG. 10 is a plot of the individually calculated friction coefficients 97 determined by the friction tool 34 for various curve radii across a plurality of mine sites for downhill travel. A 'best fit' curve 98 is also plotted for the friction coefficient points 97. As can be seen in FIG. 10, the friction coefficient may be regarded as more or less constant for curves having radii of about 100 ft or greater. Therefore, a single friction coefficient value may be used for such curves, if desired.

After the friction tool 34 has been used to determine the coefficient of lateral friction, the cornering speed tool 36 may calculate the maximum cornering vehicle speed for each defined interval 24 based on the curvature, superelevation, and lateral friction coefficient. The maximum speed achievable on a curve may exceed the 'zero lateral force' speed on the curve, i.e., the speed at which the centripetal force equal the centrifugal force, due to the frictional force developed between the tires and the roadway 16. The maximum speed $v_{max}$ through the curve may then be determined in accordance with the following equation:

$$v_{max} = (Rg(\sin\theta + \mu_s\cos\theta) / (\cos\theta - \mu_s\sin\theta))^{1/2} \qquad (3)$$

where:

$\mu_s$=coefficient of lateral friction (from Eq.2);
R=the radius of curvature of the roadway;
$\theta$=the superelevation (from Eq. 1); and
g=the acceleration due to gravity.

Referring back now to FIG. 1, the vehicle travel speed system 10 may also be provided with a plurality of models 37 to increase the accuracy of the optimal travel speed determination. In the particular embodiments shown and described herein, such models 37 may include an acceleration/deceleration model 38, an intersection model 40, an operational limits model 42, and a speed buffer model 44.

The acceleration/deceleration model 38 may utilize actual (i.e., as obtained from vehicle sensor system 26) or OEM vehicle performance data 25 to account for acceleration and deceleration (e.g., braking) capabilities of the vehicle 14. In one embodiment, the acceleration/deceleration model 38 may use published OEM retarder and rimpull data 82 and 84 (FIGS. 6a and 6b) to calculate wheel power and braking power. Thereafter, and given a road grade, travel orientation, GVW, wheel, power, and braking power, the acceleration/deceleration model 38 may calculate an achievable vehicle speed for the particular defined interval 24 of roadway 16.

The intersection model 40 uses historical vehicle data to find the minimum speed through a road intersection 29 (FIG. 2) as well as the point at which that minimum speed occurred. Using historical data accounts for variations in visibility, traffic, and interference. The intersection model 40 then sets as the speed limit the median observed speed at the snap point 46 (FIG. 3) immediately before the intersection. The historical speed data are specific to the type of turn operators make through the intersection (i.e., straight, left, or right). The median observed speeds may be based on historical data from the prior day or a prior shift.

The operational limits model 42 allows the travel speed system 10 to adjust the optimal travel speed to reflect site-specific standard operating practices (SOPs) that operators at a specific site are trained to follow. For example, certain SOPs may set or establish defined speed limits for certain roadways or intersections even though the travel speed system 10 may determine a maximum speed that exceeds the SOP speed limit. In such instances, the operational limits model 42 will cause the travel speed system 10 to automatically use the site-specific SOP in appropriate instances. No additional user input or analysis is required.

The speed buffer model 44 allows the travel speed system 10 to account for variations in vehicle speed that may be the result of measurement errors (e.g., vehicle speed as sensed by the vehicle sensor system 26) or the normal operation of vehicle systems. For example, vehicle retarder systems often result in vehicle speed oscillations when engaged. As a result, the actual vehicle speed may depart from the determined maximum speed, even though such a departure would be expected from the operation of the vehicle retarder system. The speed buffer model 44 therefore accounts for such departures without identifying the speed departure as being problematic.

With reference now primarily to FIG. 4, with occasional reference to FIG. 1, the travel speed system 10 may operate in accordance with a method 48 in order to determine a maximum travel speed for a vehicle 14 for specific defined intervals 24 of roadway 16. A first step 50 in method 48 involves determining a grade of the roadway 16 for each defined interval 24 along the roadway 16. Step 50 may be performed in conjunction with the road grade tool or module 28 in the manner already described. Step 52 involves calculating the maximum straight line vehicle speed for each of the defined intervals 24. The straight line speed is determined or calculated based on the determined grade (e.g., from step 50) and the vehicle performance data 25. Step 54 determines or calculates the radius of curvature and the superelevation of curved portions of the roadway 16. Step 54 is performed in conjunction with the road curvature tool 52. Then, the friction tool 34 is used to perform step 56 in which the lateral friction coefficient is determined for the vehicle/roadway system. Thereafter, step 58 calculates the maximum vehicle cornering speed for each defined interval 24 based on the curvature, superelevation, and lateral friction coefficient from friction tool 34. Step 58 is performed in conjunction with the cornering speed tool 36. Step 60 of method 48 calculates a maximum vehicle speed for each defined interval 24 based on the maximum straight line vehicle speed and the maximum cornering speed. For example, if, for a given defined interval 24, the straight line vehicle speed exceeds the maximum cornering speed (e.g, for curved sections of the roadway 16), then the maximum vehicle speed will be determined to be equal to the maximum cornering speed. On the other hand, if the defined interval 24 is on a straight section of roadway 16, then the optimum vehicle speed will be determined to be equal to the maximum straight line vehicle speed.

Method 48 may also include additional optional steps of the vehicle speed system 10 is provided with the additional models 37. For example, method 48 may also include step 62 that determines a vehicle speed change profile based on the acceleration/deceleration model 38. Step 64 may involve determining a vehicle intersection speed based on the intersection model 40. In such an embodiment, the step 60 of calculating a maximum vehicle speed for each defined interval will be based on the maximum straight line vehicle speed, the maximum cornering vehicle speed, the vehicle speed change profile, and the vehicle intersection speed.

In embodiments involving an operational limits model 42, method 48 may include step 66 which determines operational limits for the roadway which may limit the maximum vehicle speed calculated in step 60. Similarly, if a speed buffer model 44 is provided, then method 48 may also include step 68 which determines a speed buffer for the vehicle 14. The speed buffer is then used in step 60 to calculate the maximum vehicle speed.

Thereafter, step 70 may be performed which determines a limiting factor for the maximum vehicle speed. That is, for each defined interval 24, the travel speed system 10 may determine and display for a user the limiting factor for the maximum speed determination. Limiting factors could include, but are not limited to, acceleration, deceleration, road curvature, intersection speed limit, operational limits, or travel speed buffer.

Step 72 may involve the display of various information and data produced by method 48. For example, and with reference to FIG. 11, step 72 display the maximum vehicle speed for each defined interval 24 along the roadway 16. If desired, the limiting factor associated with the particular defined interval, may also be displayed. System 10, performing step 72, may also display the data in the form of a 'heat map' (not shown) in which the actual travel speed of the vehicle 14 is compared with the maximum vehicle speed for the respective defined intervals 24. Vehicles 14 that are traveling at about the maximum vehicle speed may be depicted in a color green, whereas vehicles that are traveling more than a defined magnitude below the maximum vehicle speed may be depicted in a color red. Vehicles 14 traveling at speeds between may be depicted in a color yellow.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of determining and controlling a vehicle travel speed on a roadway, comprising:
   determining a grade of the roadway at defined intervals along the roadway;
   calculating a maximum straight line vehicle speed for each defined interval based on the determined grade and vehicle performance data;
   determining a radius of curvature and a superelevation of the roadway for each defined interval;
   determining a lateral friction coefficient for a vehicle/roadway system;
   calculating a maximum cornering vehicle speed for each defined interval based on the curvature, superelevation, and lateral friction coefficient;
   calculating the travel speed for each defined interval based on the maximum straight line vehicle speed and the maximum cornering vehicle speed; and
   controlling the speed of the vehicle so that it does not exceed the calculated travel speed for each defined interval.

2. The method of claim 1, wherein said controlling further comprises controlling the speed of the vehicle so that it is within a tolerance of the calculated travel speed.

3. The method of claim 2, wherein said controlling further comprises operating a speed control system of the vehicle.

4. The method of claim 1, wherein said controlling further comprises issuing a speed instruction to a driver of the vehicle.

5. The method of claim 4, wherein said issuing a speed instruction to the driver of the vehicle further comprises displaying the calculated travel speed on a display system visible to the driver.

6. The method of claim 1, further comprising:
   determining a vehicle speed change profile based on an acceleration/deceleration model for the vehicle;
   determining a vehicle intersection speed based on a road/intersection model for the roadway; and
   wherein said calculating the vehicle speed for each defined interval comprises calculating a maximum vehicle speed for each defined interval based on the maximum straight line vehicle speed, the maximum cornering vehicle speed, the vehicle speed change profile, and the vehicle intersection speed.

7. The method of claim 1 further comprising determining a limiting factor for the calculated vehicle speed.

8. The method of claim 1, further comprising:
   determining operational limits for the roadway; and
   using the operational limits in said step of calculating the vehicle speed.

9. The method of claim 1, further comprising:
   determining a buffer speed for the vehicle; and
   using the buffer speed in said step of calculating the vehicle speed.

10. The method of claim 1, wherein said determining the grade of the roadway at defined intervals comprises:
    determining a median grade for each defined interval for travel in a first direction along the roadway;
    determining a median grade for each defined interval for travel in a second direction along the roadway, the second direction being opposite the first direction; and
    calculating an average of the median grades determined for travel in the first and second directions.

11. The method of claim 1, wherein each of the defined intervals comprises a substantially equal distance along the roadway.

12. The method of claim 11, wherein the substantially equal distance is about 9.1 m (about 30 feet).

13. The method of claim 1 wherein the vehicle performance data for said calculating the maximum straight line vehicle speed comprises historical sensed vehicle speeds for the defined intervals.

14. The method of claim 1, wherein the vehicle performance data for said calculating the maximum straight line vehicle speed comprises manufacturer-supplied performance data.

15. The method of claim 1, wherein said determining the radius of curvature is based on position location data obtained from the vehicle.

16. The method of claim 15, wherein the position location data comprises GPS data.

17. The method of claim 1, wherein said determining the radius of curvature is based on survey data.

18. The method of claim 15, wherein said determining the superelevation is based on a sensed differential pressure of left and right suspension struts of the vehicle.

19. The method of claim 1, wherein said determining the lateral friction coefficient is based on fastest historical sensed vehicle speeds on the curve and the determined superelevation.

20. The method of claim 6, wherein the acceleration/deceleration model is based on:
    rimpull data associated with a propulsion system of the vehicle; and
    retarder data associated with a retarder system of the vehicle.

21. The method of claim 6, wherein the road intersection model is based on historical sensed vehicle speeds at intersections.

22. The method of claim 9, wherein said determining the speed buffer for the vehicle is based on one or more selected from the group consisting of a measurement precision of a vehicle information management system and a speed oscillation caused by a vehicle retarder system.

23. A non-transitory computer-readable storage medium having computer-executable instructions embodied thereon that, when executed by at least once computer processor cause the computer processor to:
    determine a grade of the roadway at defined intervals along the roadway;
    calculate a maximum straight line vehicle speed for each defined interval based on vehicle performance data and the determined grade;
    determine a radius of curvature and a superelevation of the roadway for each defined interval;
    determine a lateral friction coefficient for a vehicle/roadway system;
    calculate a maximum cornering vehicle speed for each defined interval based on the curvature, superelevation, and lateral friction coefficient;
    calculate a vehicle speed for each defined interval based on the maximum straight line vehicle speed, the maximum cornering vehicle speed; and
    present the calculated vehicle speed for each defined interval in a user-discernible form.

24. The non-transitory computer-readable storage medium of claim 23, further comprising instructions to cause the computer processor to:
    determine a vehicle speed change profile based on an acceleration/deceleration model for the on the vehicle;

determine a vehicle intersection speed based on a road/intersection model for the roadway; and calculate the vehicle speed for each defined interval based on the maximum straight line vehicle speed, the maximum cornering vehicle speed, the vehicle speed change profile, and the vehicle intersection speed.

25. A computer implemented method of determining a vehicle travel speed on a roadway, comprising:

determining a grade of the roadway at defined intervals along the roadway;

calculating, using a computer, a maximum straight line vehicle speed for each defined interval based on the determined grade and vehicle performance data;

determining a radius of curvature and a superelevation of the roadway for each defined interval;

determining a lateral friction coefficient for a vehicle/roadway system;

calculating, using the computer, a maximum cornering vehicle speed for each defined interval based on the curvature, superelevation, and lateral friction coefficient; and calculating, using the computer, the travel speed for the vehicle for each defined interval based on the maximum straight line vehicle speed and the maximum cornering vehicle speed.

26. A system for determining and controlling a travel speed for a vehicle on a roadway, comprising:

a road grade tool, said road grade tool determining a grade of a roadway at defined intervals along the roadway based on sensor data from the vehicle;

a straight line speed tool, said straight line speed tool calculating a maximum straight line vehicle speed for each defined interval based on the determined grade from said road grade tool and vehicle performance data;

a road curvature tool, said road curvature tool calculating a road curvature and superelevation based on sensor data from the vehicle;

a friction tool, said friction tool determining a lateral friction coefficient between the vehicle and the roadway;

a cornering speed tool, said cornering speed tool calculating a maximum cornering vehicle speed for each defined interval based on the curvature, superelevation, and lateral friction coefficient;

a processing system operatively associated with said road grade tool, said straight line speed tool, said road curvature tool, said friction tool, and said cornering speed tool, said processing system calculating a travel speed for each defined interval based on the maximum straight line vehicle speed and the maximum cornering vehicle speed; and a vehicle speed control system operatively associated with said processing system, said speed control system controlling the speed of the vehicle so that it does not exceed the calculated travel speed for each defined interval.

27. The system of claim 26, further comprising:

an acceleration/deceleration model operatively associated with said processing system, said acceleration/deceleration model determining a vehicle speed change profile; and an intersection model operatively associated with said processing system, said intersection model determining vehicle intersection speed, wherein said processing system calculates the vehicle speed for each defined interval based on the maximum straight line vehicle speed, the maximum cornering vehicle speed, the vehicle speed change profile, and the vehicle intersection speed.

28. The system of claim 26, wherein said vehicle speed control system comprises a speed control system operatively connected to said vehicle.

29. The system of claim 28, wherein said vehicle speed control system comprises a display system mounted to the vehicle in a position viewable by a driver of the vehicle, said speed control system displaying the calculated vehicle speed on said display system, the driver of the vehicle controlling the speed of the vehicle so that it does not exceed the calculated travel speed for each defined interval.

* * * * *

UNITED STATES PATENT AND TRADEMARK OFFICE
CERTIFICATE OF CORRECTION

| | | |
|---|---|---|
| PATENT NO. | : 11,237,567 B2 | Page 1 of 1 |
| APPLICATION NO. | : 17/202667 | |
| DATED | : February 1, 2022 | |
| INVENTOR(S) | : Mary Amelia Walker et al. | |

It is certified that error appears in the above-identified patent and that said Letters Patent is hereby corrected as shown below:

In the Claims

Column 16, Line 67: Delete "on the"

Signed and Sealed this
Tenth Day of May, 2022

*Katherine Kelly Vidal*

Katherine Kelly Vidal
*Director of the United States Patent and Trademark Office*